United States Patent
Konudula et al.

(10) Patent No.: US 12,451,184 B2
(45) Date of Patent: Oct. 21, 2025

(54) SEMICONDUCTOR DEVICE

(71) Applicant: TAIWAN SEMICONDUCTOR MANUFACTURING COMPANY, LTD., Hsinchu (TW)

(72) Inventors: Venkateswara Reddy Konudula, Hsinchu (TW); Teja Masina, Hsinchu (TW); Nikhil Puri, Hsinchu (TW); Yen-Huei Chen, Hsinchu County (TW); Hung-Jen Liao, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 209 days.

(21) Appl. No.: 18/189,971

(22) Filed: Mar. 24, 2023

(65) Prior Publication Data

US 2024/0144997 A1    May 2, 2024

Related U.S. Application Data

(60) Provisional application No. 63/380,950, filed on Oct. 26, 2022.

(51) Int. Cl.
*G11C 11/419* (2006.01)
*G11C 11/412* (2006.01)
*H10B 10/00* (2023.01)

(52) U.S. Cl.
CPC .......... *G11C 11/419* (2013.01); *G11C 11/412* (2013.01); *H10B 10/12* (2023.02)

(58) Field of Classification Search
CPC ...... G11C 11/419; G11C 11/412; H10B 10/12
USPC .......................................................... 365/154
See application file for complete search history.

(56) References Cited

U.S. PATENT DOCUMENTS

| 2020/0185370 A1* | 6/2020 | Juengling | H01L 25/18 |
| 2022/0139430 A1* | 5/2022 | Chang | G11C 16/0425 |
| | | | 365/230.03 |

\* cited by examiner

*Primary Examiner* — Amir Zarabian
*Assistant Examiner* — Daniel J King
(74) *Attorney, Agent, or Firm* — R. Burns Israelsen (57) ABSTRACT

A semiconductor device includes a first memory array, a first bit line, a second memory array, a second bit line, a first conductive line and a first control circuit. The first bit line crosses over and is coupled to the first memory array, and extends along a first direction. The second bit line crosses over the second memory array, and is coupled to the first bit line. The first conductive line crosses over the second memory array and a part of the first memory array, and is configured to operate as a part of a first capacitor. The first control circuit is configured to couple the first conductive line to the second bit line when the first memory array is written.

20 Claims, 8 Drawing Sheets

SEMICONDUCTOR DEVICE

CROSS-REFERENCE TO RELATED APPLICATION

This application claims priority benefit of U.S. Provisional Application Ser. No. 63/380,950, filed Oct. 26, 2022, the full disclosures of which are incorporated herein by reference.

BACKGROUND

In the latest technology nodes, a minimum operating voltage (Vmin) of static random access memory (SRAM) is mostly limited by writability of the SRAM bit-cell. Write-assist circuits are required for improving Vmin of SRAM bit-cells. At lower voltages, write-assist circuits enhance writability of SRAM bit-cells significantly and in-turn increases the yield of SRAM. There are various write-assist circuit techniques. Negative bit-line (NBL) based write-assist circuits are widely used due to their better performance and yield capabilities.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. The term mask, photolithographic mask, photomask and reticle are used to refer to the same item.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

Figure 1:
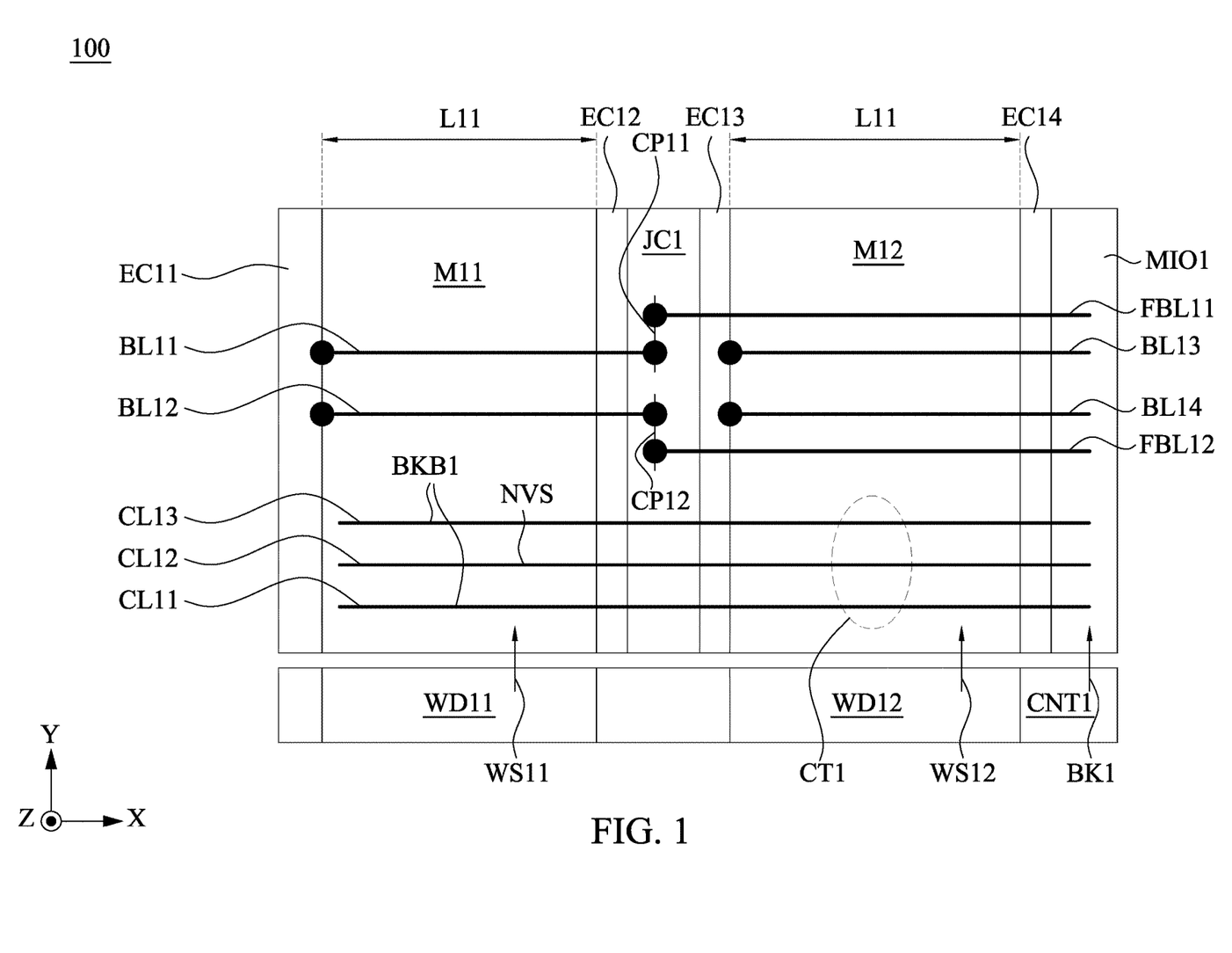
FIG. 1 is a schematic diagram of a semiconductor device, in accordance with some embodiments of the present disclosure.

FIG. 1 is a schematic diagram of a semiconductor device 100, in accordance with some embodiments of the present disclosure. In some embodiments, FIG. 1 corresponds to a layout view of the semiconductor device 100. As illustratively shown in FIG. 1, a Z direction points out from the paper.

As illustratively shown in FIG. 1, the semiconductor device 100 includes memory arrays M11, M12, control circuits CNT1 and MIO1, a connecting circuit JC1, word line drivers WD11, WD12, edge circuits EC11-EC14, bit lines BL11-BL14, flying bit lines FBL11, FBL12, and conductive lines CL11-CL13.

In some embodiments, the bit lines BL11-BL14, the flying bit lines FBL11, FBL12, and the conductive lines CL11-CL13 are implemented by conductive materials, such as metal. In some embodiments, the edge circuits EC11-EC14 include various logic elements. In some embodiments, the control circuit MIO1 is referred to as a main input/output circuit. In some embodiments, each of the memory arrays M11 and M12 corresponds to static random access memory (SRAM).

As illustratively shown in FIG. 1, the conductive line CL12 is configured to carry a voltage signal NVS. Each of the conductive lines CL11 and CL13 is configured to carry a control signal BKB1. The conductive lines CL11-CL13 are configured to form a capacitor structure CT1. Further details of the capacitor structure CT1 are described below with the embodiments associated with FIG. 4.

In some embodiments, each of the bit lines BL11 and BL12 is coupled to the memory array M11. Each of the bit lines BL13 and BL14 is coupled to the memory array M12. The word line driver WD11 is configured to provide a word line signal WS11 to the memory array M11. The word line driver WD12 is configured to provide a word line signal WS12 to the memory array M12. Each of the flying bit lines FBL11 and FBL12 is coupled to the control circuit MIO1.

In some embodiments, the memory array M11 is configured to be written to store data bits according to the word line signal WS11 and bit line signals carried by the bit lines BL11 and BL12. The memory array M12 is configured to be written to store data bits according to the word line signal WS12 and bit line signals carried by the bit lines BL13 and BL14. In some embodiments, the bit line signals carried by the bit lines BL11 and BL12 are complementary with each other, and the bit line signals carried by the bit lines BL13 and BL14 are complementary with each other.

As illustratively shown in FIG. 1, the connecting circuit JC1 includes conductive segments CP11 and CP12. The conductive segment CP11 is configured to couple the bit line BL11 to the flying bit line FBL11. The conductive segment CP12 is configured to couple the bit line BL12 to the flying bit line FBL12.

In some embodiments, the control circuit CNT1 is configured to provide a control signal BK1 to the control circuit MIO1. The control circuit MIO1 is configured to generate the control signal BKB1 based on the control signal BK1, and is configured to adjust each of voltage levels of the bit lines BL13, BL14 and the flying bit lines FBL11, FBL12 according to the control signal BKB1 and the voltage signal NVS. In some embodiments, the control signals BK1 and BKB1 are complementary with each other.

For example, when the memory array M12 is written, the control circuit MIO1 couples the conductive line CL12 to one of the bit lines BL13 and BL14, such that the one of the bit lines BL13 and BL14 has a voltage level of the voltage signal NVS. When the memory array M11 is written, the control circuit MIO1 couples the conductive line CL12 to one of the flying bit lines FBL11 and FBL12, such that the one of the flying bit lines FBL11 and FBL12 has the voltage level of the voltage signal NVS. Accordingly, a corresponding one of the bit lines BL11 and BL12 has the voltage level of the voltage signal NVS through the connection of the connecting circuit JC1.

In some embodiments, each of the memory arrays M11 and M12 includes multiple memory cells (not shown in figures) arranged in rows and columns. For example, each of the memory arrays M11 and M12 includes 512 memory cell rows arranged along an X direction which is perpendicular with the Z direction in some embodiments.

As illustratively shown in FIG. 1, the edge circuit EC11, the memory array M11, the edge circuit EC12, the connecting circuit JC1, the edge circuit EC13, the memory array M12, the edge circuit EC14 and the control circuit MIO1 are arranged in order along the X direction, and are aligned with each other along the X direction. The word line drivers WD11, WD12 and the control circuit CNT1 are arranged in order along the X direction, and are aligned with each other along the X direction. The word line drivers WD11 and the memory array M11 are arranged in order along a Y direction which is perpendicular with the X direction and the Z direction in some embodiments.

As illustratively shown in FIG. 1, each of the bit lines BL11-BL14, the flying bit lines FBL11, FBL12, and the conductive lines CL11-CL13 extends along the X direction. Each of the bit lines BL11 and BL12 crosses over the memory array M11 and the edge circuit EC12, and is coupled to the edge circuit EC11 and the connecting circuit JC1. Each of the bit lines BL13 and BL14 crosses over the memory array M12 and the edge circuit EC14, and is coupled to the edge circuit EC13 and the control circuit MIO1. Each of the flying bit lines FBL11 and FBL12 crosses over the memory array M12 and the edge circuits EC13, EC14, and is coupled to the control circuit MIO1 and the connecting circuit JC1.

As illustratively shown in FIG. 1, the conductive lines CL11-CL13 are arranged in order along the Y direction. Each of conductive lines CL11-CL13 crosses over the memory array M12, the connecting circuit JC1, the edge circuits EC12-EC14 and most parts of the memory array M11, and is coupled to a leftmost memory cell (not shown in figures) of the memory array M11 and the control circuit MIO1.

In some embodiments, along the X direction, each of the memory arrays M11 and M12 has a length L11, each of the lengths of the bit lines BL11-BL14 and the flying bit lines FBL11, FBL12 is larger than the length L11, and each of the lengths of the conductive lines CL11-CL13 is larger than twice of the length L11.

In some embodiments, the conductive lines CL11-CL13, the bit lines BL11-BL14 and the flying bit lines FBL11, FBL12 are disposed in different layers of the semiconductor device 100. For example, the bit lines BL11-BL14 are disposed in a metal-zero (M0) layer, the flying bit lines FBL11 and FBL12 are disposed in a metal-two (M2) layer, and the conductive lines CL11-CL13 are disposed in a metal-four (M4) layer. The M0 layer, M2 layer and the M4 layer are arranged along the Z direction in order. Accordingly, along the Z direction, the conductive lines CL11-CL13 are disposed above the flying bit lines FBL11 and FBL12, and the flying bit lines FBL11 and FBL12 are disposed above the bit lines BL11-BL14. The term "flying" of the flying bit lines FBL11 and FBL12 represents that the flying bit lines FBL11 and FBL12 are higher than the bit lines BL11-BL14.

In some approaches, a control circuit adjusts voltage levels of bit lines coupled to memory arrays for assisting write operations. However, when an amount of the memory arrays increases, required capacitances are required to achieve desired voltage levels. Adding device capacitance in the control circuit needs extra areas.

Compared to the above approaches, in some embodiments of the present disclosure, the conductive lines CL11-CL13 with the lengths larger than twice of the length L11 form the capacitor structure CT1 having a large capacitance. Accordingly, a required area of the control circuit MIO1 is reduced.

Figure 2:
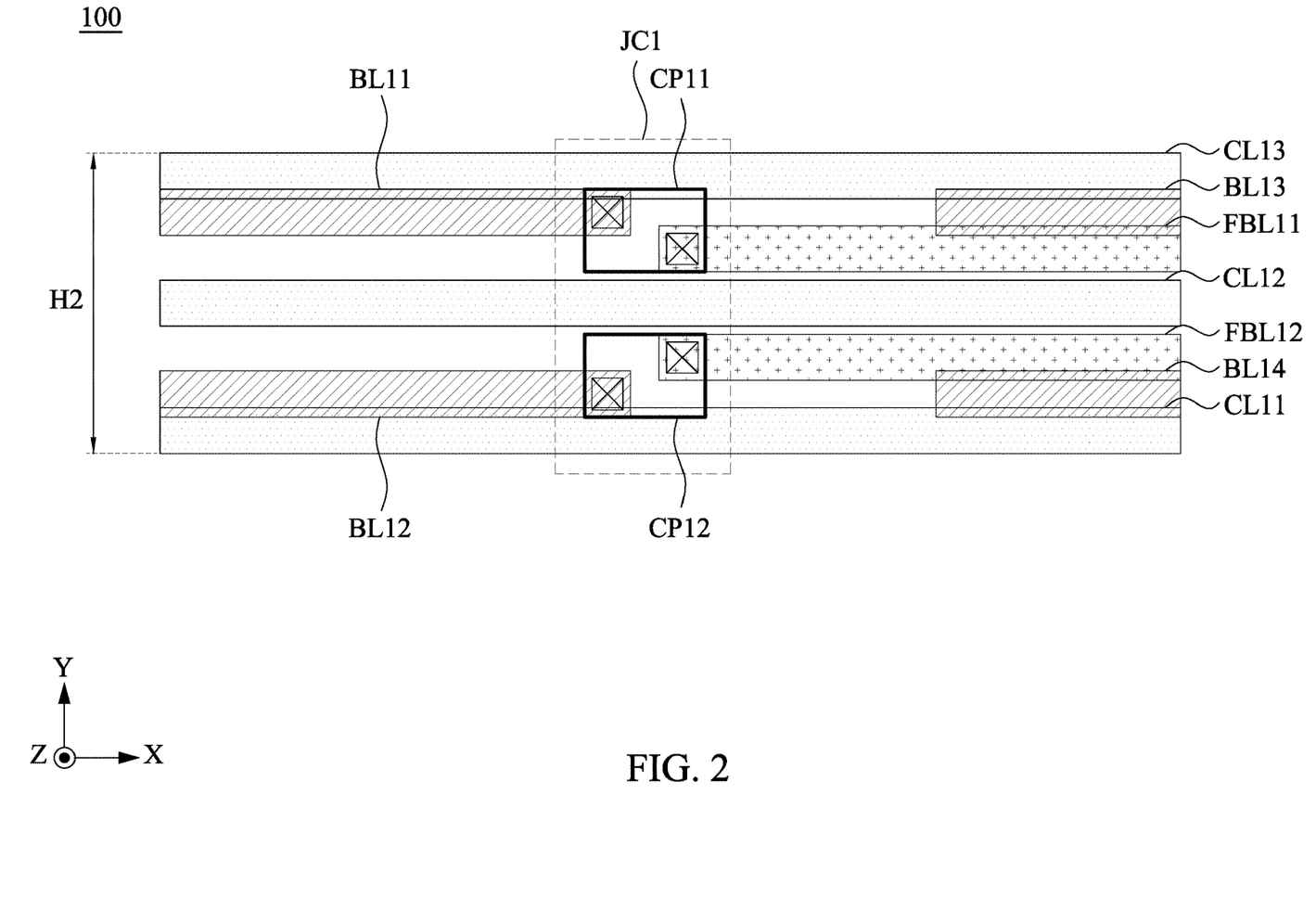
FIG. 2 is a layout diagram of a portion of the semiconductor device shown in FIG. 1, in accordance with some embodiments of the present disclosure.

FIG. 2 is a layout diagram of a portion of the semiconductor device 100 shown in FIG. 1, in accordance with some embodiments of the present disclosure. As illustratively shown in FIG. 2, the conductive segment CP11 of the connecting circuit JC is partially overlapped with each of the bit line BL11 and the flying bit line FBL11, and is coupled to the bit line BL11 and the flying bit line FBL11. The conductive segment CP12 of the connecting circuit JC1 is partially overlapped with each of the bit line BL12 and the flying bit line FBL12, and is coupled to the bit line BL12 and the flying bit line FBL12.

In some embodiments, each of the conductive segments CP11 and CP12 is disposed in a layer between the bit line BL11 and the flying bit line FBL11. For example, the each of the conductive segments CP11 and CP12 is disposed in a metal-one (M1) layer between the M0 layer and the M2 layer. Accordingly, along the Z direction, the flying bit lines FBL11 and FBL12 are disposed above the conductive segments CP11 and CP12, and the conductive segments CP11 and CP12 are disposed above the bit lines BL11-BL14. In some embodiments, the bit line signals jump from the flying bit lines FBL11 and FBL12 to the bit lines BL11 and BL12 through the conductive segments CP11 and CP12, and the connecting circuit JC1 is referred to as a jumper cell.

As illustratively shown in FIG. 2, the conductive segment CL13 is partially overlapped with each of the bit lines BL11 and BL13. The flying bit line FBL11 is partially overlapped with the bit line BL13. The conductive segment CL11 is partially overlapped with each of the bit lines BL12 and BL14. The flying bit line FBL12 is partially overlapped with the bit line BL14. Along the Y direction, the conductive segment CL12 is disposed between the flying bit lines FBL11 and FBL12, and is disposed between the bit lines BL11 and BL12.

In some embodiments, along the Y direction, the conductive segments CP11, CP12, the conductive segments CL11-CL13, the flying bit lines FBL11, FBL12 and the bit lines BL11-BL14 are disposed within a height H2. Referring to FIG. 1 and FIG. 2, the height H2 corresponds to a height of a memory cell in the memory array M11 along the Y direction.

Figure 3:
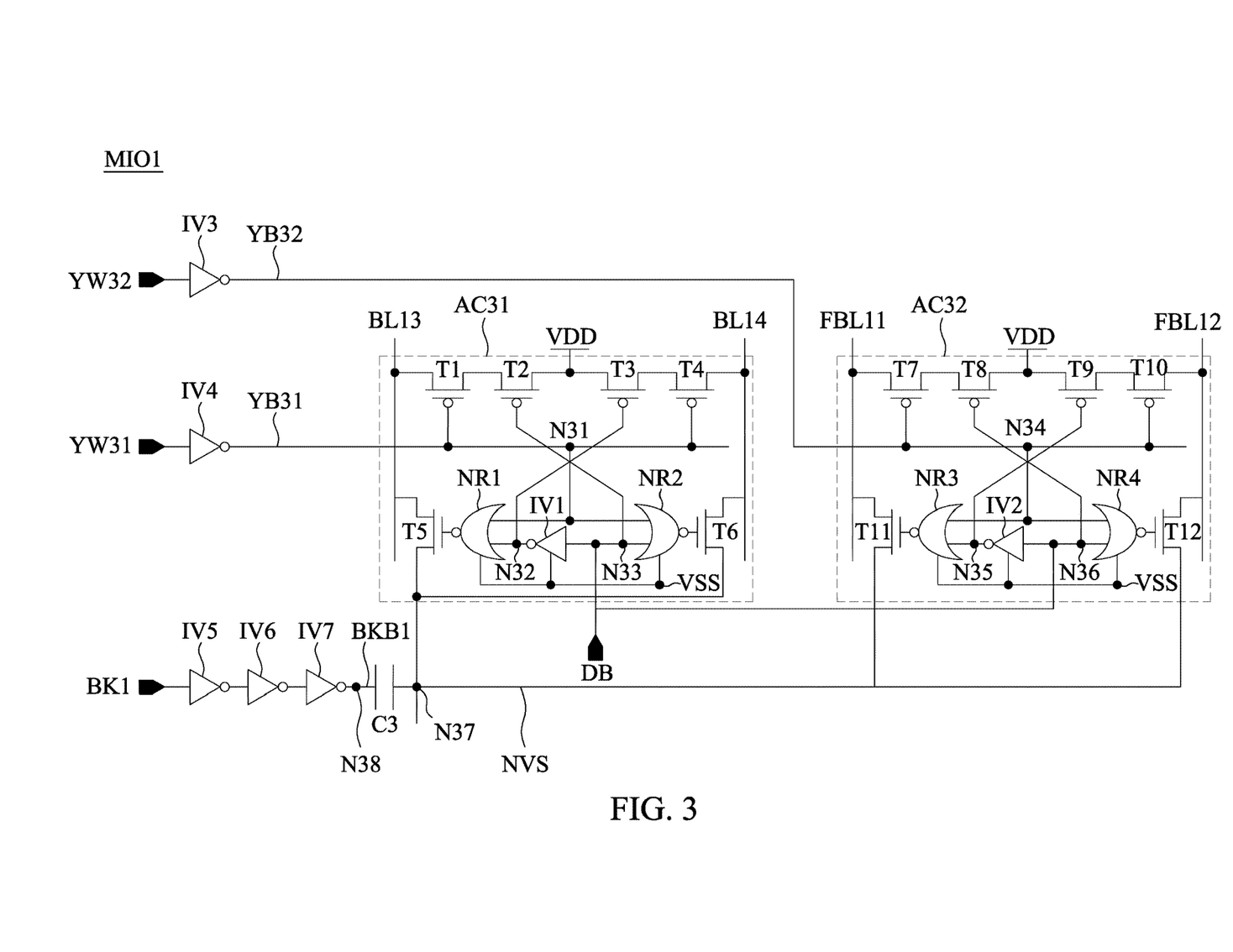
FIG. 3 is a circuit diagram of a part of a control circuit of the semiconductor device shown in FIG. 1, in accordance with some embodiments of the present disclosure.

FIG. 3 is a circuit diagram of a part of the control circuit MIO1 of the semiconductor device 100 shown in FIG. 1, in accordance with some embodiments of the present disclosure. As illustratively shown in FIG. 3, the control circuit MIO1 includes write driver circuits AC31, AC32, assisting circuits, a capacitor C3 and inverters IV3-IV7.

In some embodiments, the assisting circuits are configured to adjust the voltage levels of the bit lines BL13 and BL14 according to a data signal DB, a control signal YB31 and the voltage signal NVS. The same assisting circuits are configured to adjust the voltage levels of the bit lines FBL11 and FBL12 according to the data signal DB, a control signal YB32 and the voltage signal NVS.

As illustratively shown in FIG. 3, the inverter IV3 is configured to generate the control signal YB32 based on a control signal YW32. The inverter IV4 is configured to generate the control signal YB31 based on a control signal YW31. The inverters IV5-IV7 are coupled in series, and are configured to generate the control signal BKB1 at a node N38 based on the control signal BK1. The capacitor C3 is coupled between a node N37 and the node N38, and is configured to adjust the voltage signal NVS at the node N37 based on the control signal BKB1.

As illustratively shown in FIG. 3, the write driver circuit AC31 includes switches T1-T6, NOR logic gates NR1, NR2 and an inverter IV1. The switches T1 and T2 are coupled in series between the bit line BL13 and a reference voltage terminal VDD. The switches T3 and T4 are coupled in series between the bit line BL14 and the reference voltage terminal VDD. Control terminals of the switches T1 and T4 are coupled to a node N31. A control terminal of the switch T2 is coupled to a node N33. A control terminal of the switch T3 is coupled to a node N32. The switch T5 is coupled between the node N37 and the bit line BL13. The switch T6 is coupled between the node N37 and the bit line BL14. In some embodiments, the switches T1-T4 are implemented by p-type metal-oxide-semiconductor (PMOS) transistors, and the switches T5-T6 are implemented by n-type metal-oxide-semiconductor (NMOS) transistors.

As illustratively shown in FIG. 3, an input terminal of the inverter IV1 is coupled to the node N33, and an output terminal of the inverter IV1 is coupled to the node N32. A first input terminal of the NOR logic gates NR1 is coupled to the node N31, a second input terminal of the NOR logic gates NR1 is coupled to the node N32, and a control terminal of the NOR logic gates NR1 is coupled to a control terminal of the switch T5. A first input terminal of the NOR logic gates NR2 is coupled to the node N31, a second input terminal of the NOR logic gates NR2 is coupled to the node N33, and a control terminal of the NOR logic gates NR2 is coupled to a control terminal of the switch T6. In some embodiments, the NOR logic gates NR1, NR2 and the inverter IV1 are configured to operate according a reference voltage signal VSS.

As illustratively shown in FIG. 3, the write driver circuit AC31 is configured to receive the control signal YB31 and the data signal DB at the nodes N31 and N33, respectively. The NOR logic gates NR1 is configured to control the switch T5 based on the control signal YB31 and the data signal DB. The NOR logic gates NR2 is configured to control the switch T6 based on the control signal YB31 and the data signal DB.

Referring to FIG. 3 and FIG. 1, the control signal YB31 indicates that the memory array M12 is written or not. The data signal DB has a logic value to be written into the memory array M12. When the memory array M12 is written according the data signal DB, one of the switches T5 and T6 is turned on to couple a corresponding one of the bit lines BL13 and BL14 to the node N37, to pull the corresponding one of the bit lines BL13 and BL14 to the voltage level of the voltage signal NVS.

As illustratively shown in FIG. 3, the write driver circuit AC32 includes switches T7-T12, NOR logic gates NR3, NR4 and an inverter IV2. The switches T7 and T8 are coupled in series between the flying bit line FBL11 and a reference voltage terminal VDD. The switches T9 and T10 are coupled in series between the flying bit line FBL12 and the reference voltage terminal VDD. Control terminals of the switches T7 and T10 are coupled to a node N34. A control terminal of the switch T9 is coupled to a node N35. A control terminal of the switch T8 is coupled to a node N36. The switch T11 is coupled between the node N37 and the flying bit line FBL11. The switch T12 is coupled between the node N37 and the flying bit line FBL12. In some embodiments, the switches T7-T10 are implemented by PMOS transistors, and the switches T11-T12 are implemented by NMOS transistors.

As illustratively shown in FIG. 3, an input terminal of the inverter IV2 is coupled to the node N36, and an output terminal of the inverter IV2 is coupled to the node N35. A first input terminal of the NOR logic gates NR3 is coupled to the node N34, a second input terminal of the NOR logic gates NR3 is coupled to the node N35, and a control terminal of the NOR logic gates NR3 is coupled to a control terminal of the switch T11. A first input terminal of the NOR logic gates NR4 is coupled to the node N34, a second input terminal of the NOR logic gates NR4 is coupled to the node N36, and a control terminal of the NOR logic gates NR4 is coupled to a control terminal of the switch T12. In some embodiments, the NOR logic gates NR3, NR4 and the inverter IV2 are configured to operate according the reference voltage signal VSS.

As illustratively shown in FIG. 3, the write driver circuit AC32 is configured to receive the control signal YB32 and the data signal DB at the nodes N34 and N36, respectively. The NOR logic gates NR3 is configured to control the switch T11 based on the control signal YB32 and the data signal DB. The NOR logic gates NR4 is configured to control the switch T12 based on the control signal YB32 and the data signal DB.

Referring to FIG. 3 and FIG. 1, the control signal YB32 indicates that the memory array M11 is written or not. The data signal DB further has a logic value to be written into the memory array M11. When the memory array M11 is written according the data signal DB, one of the switches T11 and T12 is turned on to couple a corresponding one of the flying bit lines FBL11 and FBL12 to the node N37, to pull the corresponding one of the flying bit lines FBL11 and FBL12 and a corresponding one of the bit lines BL11 and BL12 to the voltage level of the voltage signal NVS.

In some embodiments, when one of the memory arrays M11 and M12 is written, a voltage level of the control signal BK1 is increased to decrease a voltage level of the control signal BKB1, such that the capacitor C3 decreases the voltage level of the voltage signal NVS based on the control signal BKB1 through capacitive coupling.

Referring to FIG. 3 and FIG. 1, the capacitor C3 corresponds to the capacitor structure CT1 shown in FIG. 1. In some embodiments, the conductive line CL12 is coupled to the node N37, and each of conductive lines CL11 and CL13 is coupled to the node N38.

Figure 4:
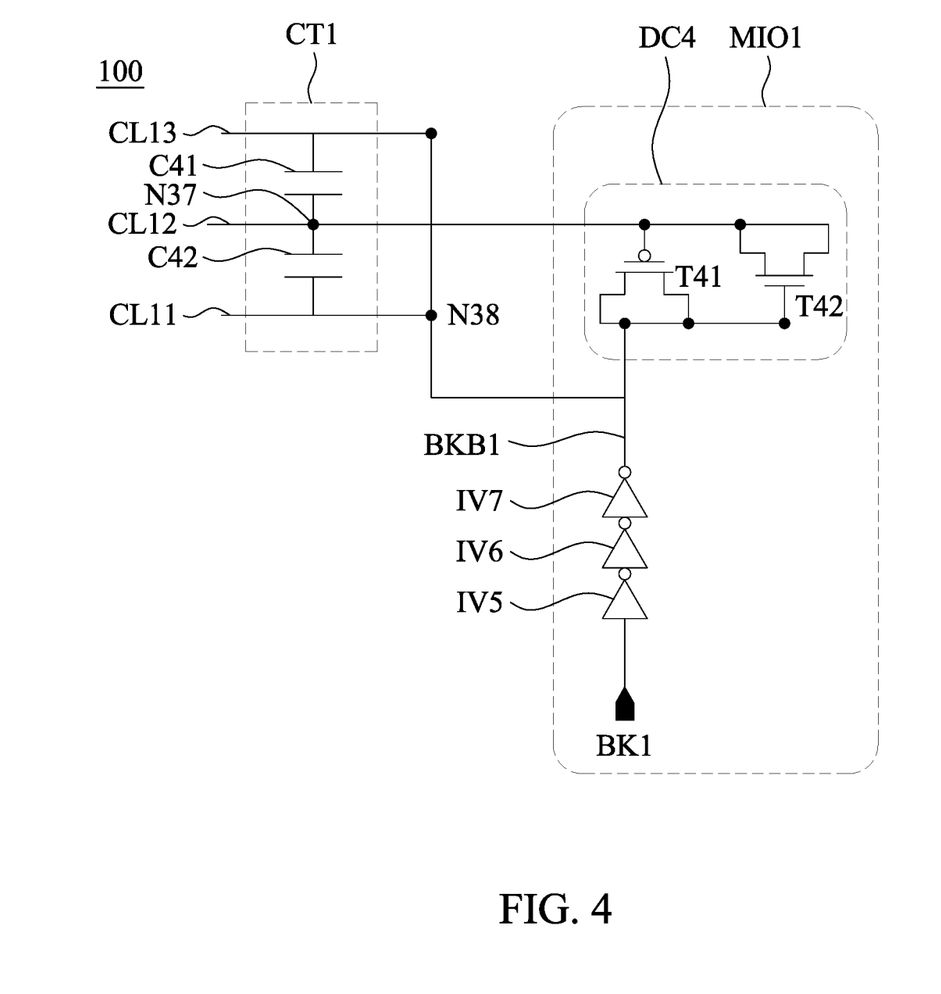
FIG. 4 is a circuit diagram of a part of the semiconductor device shown in FIG. 1, in accordance with some embodiments of the present disclosure.

FIG. 4 is a circuit diagram of a part of the semiconductor device 100 shown in FIG. 1, in accordance with some embodiments of the present disclosure. As illustratively shown in FIG. 4, the control circuit MIO1 includes the inverters IV5-IV7 and a capacitor structure DC4. The capacitor structures DC4 and CT1 are coupled to each other at the nodes N37 and N38. The inverters IV5-IV7 are configured to receive the control signal BK1 and output the control signal BKB1 to the node N38. Further details of the inverters IV5-IV7, the capacitor structure CT1, the nodes N37 and N38 and the control signals BK1 and BKB1 are described above with the embodiments associated with the FIG. 1 to FIG. 3. Therefore, some descriptions are not repeated for brevity.

As illustratively shown in FIG. 4, the capacitor structure DC4 includes switches T41 and T42. Each of a first terminal of the switch T41 and a second terminal of the switch T41 is coupled to the node N38, and a control terminal of the switch T41 is coupled to the node N37. Each of a first terminal of the switch T42 and a second terminal of the switch T42 is coupled to the node N37, and a control terminal of the switch T41 is coupled to the node N38.

In some embodiments, the switches T41 and T42 are configured to operate as a capacitor coupled between the nodes N37 and N38, and are implemented by a PMOS transistor and a NMOS transistor, respectively. The capacitor structure DC4 is referred to as a device capacitor of the control circuit MIO1.

As illustratively shown in FIG. 4, the capacitor structure CT1 includes capacitors C41 and C42 coupled in parallel between the nodes N37 and N38. A first terminal of the capacitor C41 is coupled to the node N37 and corresponds to the conductive line CL12. A second terminal of the capacitor C41 is coupled to the node N38 and corresponds to the conductive line CL13. A first terminal of the capacitor C42 is coupled to the node N37 and corresponds to the conductive line CL12. A second terminal of the capacitor C42 is coupled to the node N38 and corresponds to the conductive line CL11.

Referring to FIG. 1 and FIG. 4, in some embodiments, the capacitor C41 is formed by the conductive lines CL12 and CL13, and the capacitor C42 is formed by the conductive lines CL12 and CL11. In some embodiments, the capacitors C41 and C42 are referred to as metal capacitors coupled in parallel with the capacitor structure DC4. Referring to FIG. 4 and FIG. 3, the capacitor C3 corresponds to the capacitor structures CT1 and DC4.

Figure 5:
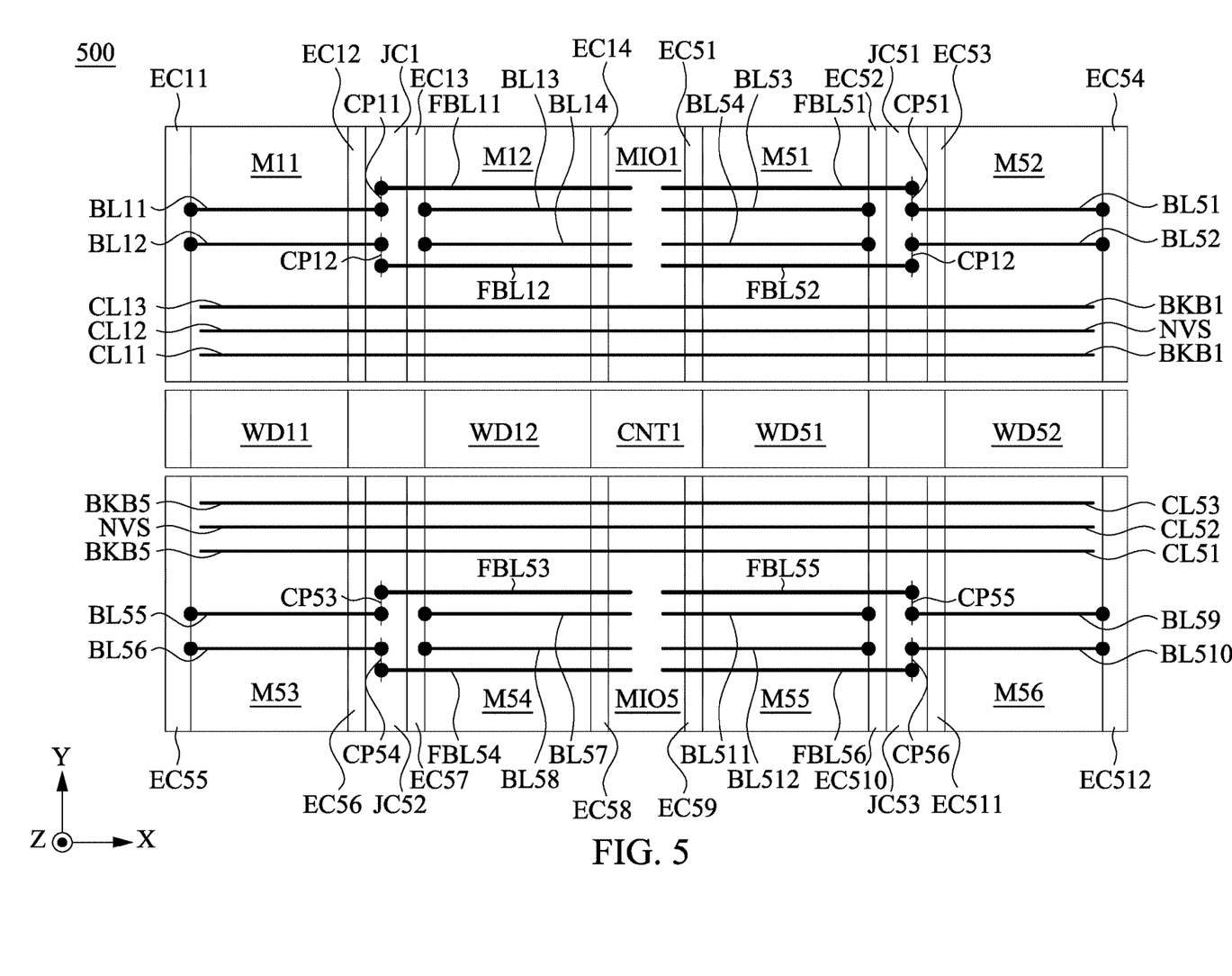
FIG. 5 is a schematic diagram of a semiconductor device corresponding to the semiconductor device shown in FIG. 1, in accordance with some embodiments of the present disclosure.

Referring to FIG. 5 and FIG. 1, the semiconductor device 500 is an alternative embodiment of the semiconductor device 100. The upper left part of the semiconductor device 500 is similar to the semiconductor device 100. FIG. 5 follows a similar labeling convention to that of FIG. 1. For brevity, the discussion will focus more on differences between FIG. 1 and FIG. 5 than on similarities.

Referring to FIG. 5 and FIG. 1, comparing with the semiconductor device 100, the semiconductor device 500 further includes memory arrays M51-M56, a control circuit MIO5, edge circuits EC51-EC512, bit lines BL51-BL512, flying bit lines FBL51-FBL56, conductive lines CL51-CL53, word line drivers WD51, WD52 and the edge circuit EC51-EC512.

In some embodiments, each of the bit lines BL51 and BL52 is coupled to the memory array M52. Each of the bit lines BL53 and BL54 is coupled to the memory array M51. The word line drivers WD51 and WD52 are configured to provide word line signals to the memory arrays M51 and M52. Each of the flying bit lines FBL51 and FBL52 is coupled to the control circuit MIO1.

In some embodiments, the memory array M52 is configured to be written to store data bits according to bit line signals carried by the bit lines BL51 and BL52. The memory array M51 is configured to be written to store data bits according to bit line signals carried by the bit lines BL53 and BL54. In some embodiments, the bit line signals carried by the bit lines BL51 and BL52 are complementary with each other, and the bit line signals carried by the bit lines BL53 and BL54 are complementary with each other.

As illustratively shown in FIG. 5, the connecting circuit JC51 includes conductive segments CP51 and CP52. The conductive segment CP51 is configured to couple the bit line BL51 to the flying bit line FBL51. The conductive segment CP52 is configured to couple the bit line BL52 to the flying bit line FBL52.

In some embodiments, the control circuit MIO1 is further configured to adjust each of voltage levels of the bit lines BL53, BL54 and the flying bit lines FBL51, FBL52 according to the control signal BKB1 and the voltage signal NVS. For example, when the memory array M51 is written, the control circuit MIO1 couples the conductive line CL12 to one of the bit lines BL53 and BL54, such that the one of the bit lines BL53 and BL54 has the voltage level of the voltage signal NVS. When the memory array M52 is written, the control circuit MIO1 couples the conductive line CL12 to one of the flying bit lines FBL51 and FBL52, such that the one of the flying bit lines FBL51 and FBL52 has the voltage level of the voltage signal NVS. Accordingly, a corresponding one of the bit lines BL51 and BL12 has the voltage level of the voltage signal NVS through the connection of the connecting circuit JC51.

As illustratively shown in FIG. 5, the conductive line CL52 is configured to carry the voltage signal NVS. Each of the conductive lines CL51 and CL53 is configured to carry a control signal BKBS. Each of the bit lines BL55 and BL56 is coupled to the memory array M53. Each of the bit lines BL57 and BL58 is coupled to the memory array M54. Each of the bit lines BL59 and BL510 is coupled to the memory array M56. Each of the bit lines BL511 and BL512 is coupled to the memory array M55.

As illustratively shown in FIG. 5, the word line drivers WD11, WD12, WD51 and WD52 are further configured to provide word line signals to the memory arrays M53-M56. Each of the flying bit lines FBL53-FBL56 is coupled to the control circuit MIO5.

In some embodiments, the memory array M53 is configured to be written to store data bits according to bit line signals carried by the bit lines BL55 and BL56. The memory array M54 is configured to be written to store data bits according to bit line signals carried by the bit lines BL57 and BL58. The memory array M55 is configured to be written to store data bits according to bit line signals carried by the bit lines BL511 and BL512. The memory array M56 is configured to be written to store data bits according to bit line signals carried by the bit lines BL59 and BL510.

In some embodiments, the bit line signals carried by the bit lines BL55 and BL56 are complementary with each other, the bit line signals carried by the bit lines BL57 and BL58 are complementary with each other, the bit line signals carried by the bit lines BL59 and BL510 are complementary with each other, and the bit line signals carried by the bit lines BL511 and BL512 are complementary with each other.

As illustratively shown in FIG. 5, the connecting circuit JC52 includes conductive segments CP53 and CP54. The connecting circuit JC53 includes conductive segments CP55 and CP56. The conductive segment CP53 is configured to couple the bit line BL55 to the flying bit line FBL53. The conductive segment CP54 is configured to couple the bit line BL56 to the flying bit line FBL54. The conductive segment CP55 is configured to couple the bit line BL59 to the flying bit line FBL55. The conductive segment CP56 is configured to couple the bit line BL510 to the flying bit line FBL56.

In some embodiments, the control circuit CNT1 is further configured to provide a control signal to the control circuit MIO5. The control circuit MIO5 is configured to generate the control signal BKBS based on the control signal from the control circuit CNT1, and adjust each of voltage levels of the bit lines BL57, BL58, BL511, BL512 and the flying bit lines FBL53-FBL56 according to the control signal BKBS and the voltage signal NVS.

For example, when the memory array M54 is written, the control circuit MIO5 couples the conductive line CL52 to one of the bit lines BL57 and BL58, such that the one of the bit lines BL57 and BL58 has the voltage level of the voltage signal NVS. When the memory array M53 is written, the control circuit MIO5 couples the conductive line CL52 to one of the flying bit lines FBL53 and FBL54, such that the one of the flying bit lines FBL53 and FBL54 has the voltage level of the voltage signal NVS. Accordingly, a corresponding one of the bit lines BL55 and BL56 has the voltage level of the voltage signal NVS through the connection of the connecting circuit JC52.

For another example, when the memory array M55 is written, the control circuit MIO5 couples the conductive line CL52 to one of the bit lines BL511 and BL512, such that the one of the bit lines BL511 and BL512 has the voltage level of the voltage signal NVS. When the memory array M56 is written, the control circuit MIO5 couples the conductive line CL52 to one of the flying bit lines FBL55 and FBL56, such that the one of the flying bit lines FBL55 and FBL56 has the voltage level of the voltage signal NVS. Accordingly, a corresponding one of the bit lines BL59 and BL510 has the voltage level of the voltage signal NVS through the connection of the connecting circuit JC53.

In some embodiments, each of the memory arrays M51-M56 includes multiple memory cells (not shown in figures) arranged in rows and columns. For example, each of the memory arrays M51-M56 includes 512 memory cell rows arranged along the X direction. Referring to FIG. 5 and FIG. 1, each of the memory arrays M51-M56 has the length L11 along the X direction.

As illustratively shown in FIG. 5, the edge circuit EC14, the control circuit MIO1, the edge circuit EC51, the memory array M51, the edge circuit EC52, the connecting circuit JC51, the edge circuit EC53, the memory array M52 and the edge circuit EC54 are aligned with each other and are arranged in order along the X direction. The word line driver WD12, the control circuit CNT1, the word line drivers WD51 and WD52 are aligned with each other and are arranged in order along the X direction. The edge circuit EC55, the memory array M53, the edge circuit EC56, the connecting circuit JC52, the edge circuit EC57, the memory array M54, the edge circuit EC58, the control circuit MIO5, the edge circuit EC59, the memory array M55, the edge circuit EC510, the connecting circuit JC53, the edge circuit EC511, the memory array M56 and the edge circuit EC512 are aligned with each other and are arranged in order along the X direction. The memory array M53, the word line driver WD11 and the memory array M11 are arranged in order along the Y direction.

As illustratively shown in FIG. 5, each of the bit lines BL51-BL512, the flying bit lines FBL51-FBL56, and the conductive lines CL51-CL53 extends along the X direction. Each of the bit lines BL51 and BL52 crosses over the memory array M52 and the edge circuit EC53, and is coupled to the edge circuit EC54 and the connecting circuit JC51. Each of the bit lines BL53 and BL54 crosses over the memory array M51 and the edge circuit EC51, and is coupled to the edge circuit EC52 and the control circuit MIO1. Each of the flying bit lines FBL51 and FBL52 crosses over the memory array M51 and the edge circuits EC51, EC52, and is coupled to the control circuit MIO1 and the connecting circuit JC51.

As illustratively shown in FIG. 5, each of conductive lines CL11-CL13 further crosses over the memory array M51, the connecting circuit JC51, the edge circuits EC51-EC53 and most parts of the memory array M52, and is coupled to a rightmost memory cell (not shown in figures) of the memory array M52 and control circuit MIO1.

As illustratively shown in FIG. 5, each of the bit lines BL55 and BL56 crosses over the memory array M53 and the edge circuit EC56, and is coupled to the edge circuit EC55 and the connecting circuit JC52. Each of the bit lines BL57 and BL58 crosses over the memory array M54 and the edge circuit EC58, and is coupled to the edge circuit EC57 and the control circuit MIO5. Each of the flying bit lines FBL53 and FBL54 crosses over the memory array M54 and the edge circuits EC57, EC58, and is coupled to the control circuit MIO5 and the connecting circuit JC52.

As illustratively shown in FIG. 5, each of the bit lines BL59 and BL510 crosses over the memory array M56 and the edge circuit EC511, and is coupled to the edge circuit EC512 and the connecting circuit JC53. Each of the bit lines BL511 and BL512 crosses over the memory array M55 and the edge circuit EC59, and is coupled to the edge circuit EC510 and the control circuit MIO5. Each of the flying bit lines FBL55 and FBL56 crosses over the memory array M55 and the edge circuits EC59, EC510, and is coupled to the control circuit MIO5 and the connecting circuit JC53.

As illustratively shown in FIG. 5, the conductive lines CL51-CL53 are arranged in order along the Y direction. Each of conductive lines CL51-CL53 crosses over the memory arrays M54, M55, the connecting circuits JC52, JC53, the edge circuits EC56-EC511, most parts of the memory arrays M53 and most parts of the memory arrays M56, and is coupled to a rightmost memory cell (not shown in figures) of the memory array M56, a leftmost memory cell (not shown in figures) of the memory array M53 and the control circuit MIO5. In some embodiments, the conductive lines CL51 and CL52 are configured to operate as a capacitor, and the conductive lines CL53 and CL52 are configured to operate as another capacitor.

Referring to FIG. 1 to FIG. 5, configurations of each of the memory arrays M52, M53 and M56 are similar to the configurations of the memory array M11. Configurations of each of the memory arrays M51, M54 and M55 are similar to the configurations of the memory array M12. Configurations of each of the connecting circuit JC51-JC53 are similar to the configurations of the connecting circuit JCL. Configurations of each of the bit lines BL51-BL512 are similar to the configurations of a corresponding one of the bit lines BL1l-BL14. Configurations of each of the flying bit lines FBL51-FBL56 are similar to the configurations of a corresponding one of the flying bit lines FBL11 and FBL12. Configurations of the conductive lines CL51-CL53 are similar to the conductive lines CL1l-CL13, respectively. Therefore, some descriptions are not repeated for brevity.

Referring to FIG. 1 and FIG. 5, along the X direction, each of the memory arrays M51-M56 has the length L11, each of the lengths of the bit lines BL51-BL512 and the flying bit lines FBL51-FBL56 is larger than the length L11, and each of the lengths of the conductive lines CL11-CL13 and CL51-CL53 is larger than four times of the length L11.

In some embodiments, the bit lines BL51-BL512 are disposed in the M0 layer, flying bit lines FBL51-FBL56 are disposed in the M2 layer, and the conductive lines CL51-CL53 are disposed in the M4 layer. Accordingly, along the Z direction, the conductive lines CL51-CL53 are disposed above the flying bit lines FBL51-FBL56, and the flying bit lines FBL51-FBL56 are disposed above the bit lines BL51-BL512.

Figure 6:
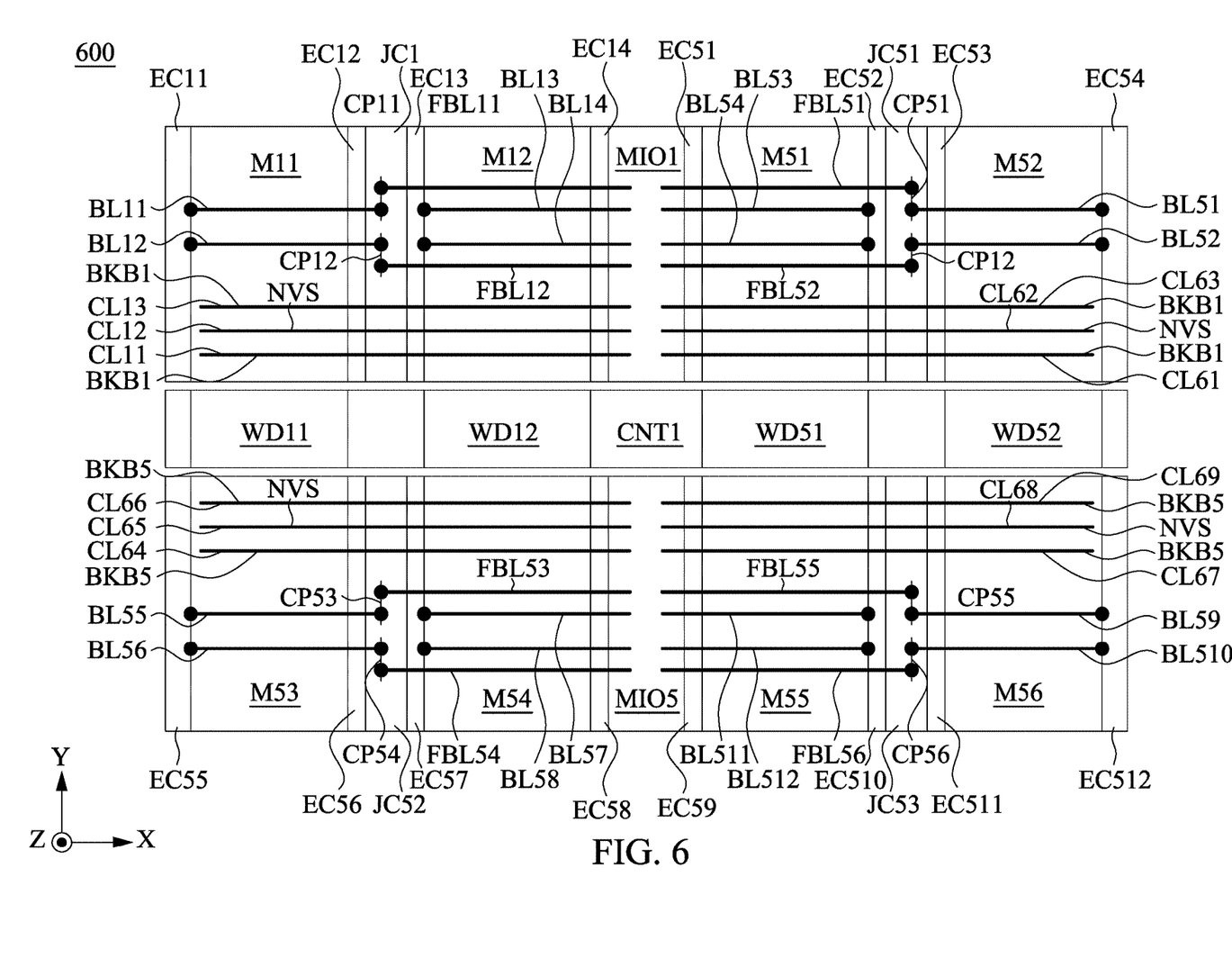
FIG. 6 is a schematic diagram of a semiconductor device corresponding to the semiconductor device shown in FIG. 5, in accordance with some embodiments of the present disclosure.

FIG. 6 is a schematic diagram of a semiconductor device 600 corresponding to the semiconductor device 500 shown in FIG. 5, in accordance with some embodiments of the present disclosure. In some embodiments, FIG. 6 corresponds to a layout view of the semiconductor device 600.

Referring to FIG. 6 and FIG. 5, the semiconductor device 600 is an alternative embodiment of the semiconductor device 500. FIG. 6 follows a similar labeling convention to that of FIG. 5. For brevity, the discussion will focus more on differences between FIG. 6 and FIG. 5 than on similarities. Comparing with the semiconductor device 100C, the semiconductor device 600 includes conductive lines CL61-CL69 instead of the conductive lines CL51-CL53.

As illustratively shown in FIG. 6, each of the conductive lines CL62, CL65 and CL68 is configured to carry the voltage signal NVS. Each of the conductive lines CL64, CL66, CL67 and CL69 is configured to carry the control signal BKBS. Each of the conductive lines CL61 and CL63 is configured to carry the control signal BKB1.

In some embodiments, when the memory array M51 is written, the control circuit MIO1 couples the conductive line CL62 to one of the bit lines BL53 and BL54, such that the one of the bit lines BL53 and BL54 has the voltage level of the voltage signal NVS. When the memory array M52 is written, the control circuit MIO1 couples the conductive line CL62 to one of the flying bit lines FBL51 and FBL52, such that the one of the flying bit lines FBL51 and FBL52 has the voltage level of the voltage signal NVS. Accordingly, a corresponding one of the bit lines BL51 and BL52 has the voltage level of the voltage signal NVS through the connection of the connecting circuit JC52.

In some embodiments, when the memory array M54 is written, the control circuit MIO5 couples the conductive line CL65 to one of the bit lines BL57 and BL58, such that the one of the bit lines BL57 and BL58 has the voltage level of the voltage signal NVS. When the memory array M53 is written, the control circuit MIO5 couples the conductive line CL65 to one of the flying bit lines FBL53 and FBL54, such that the one of the flying bit lines FBL53 and FBL54 has the voltage level of the voltage signal NVS. Accordingly, a corresponding one of the bit lines BL55 and BL56 has the voltage level of the voltage signal NVS through the connection of the connecting circuit JC52.

In some embodiments, when the memory array M55 is written, the control circuit MIO5 couples the conductive line CL68 to one of the bit lines BL511 and BL512, such that the one of the bit lines BL511 and BL512 has the voltage level of the voltage signal NVS. When the memory array M56 is written, the control circuit MIO5 couples the conductive line CL68 to one of the flying bit lines FBL55 and FBL56, such that the one of the flying bit lines FBL55 and FBL56 has the voltage level of the voltage signal NVS. Accordingly, a corresponding one of the bit lines BL59 and BL510 has the voltage level of the voltage signal NVS through the connection of the connecting circuit JC53.

As illustratively shown in FIG. 6, the conductive lines CL61-CL63 are arranged in order along the Y direction, and are separated from the conductive lines CL11-CL13 along the X direction. Each of conductive lines CL61-CL63 crosses over the memory array M51, the connecting circuit JC51, the edge circuits EC51-EC53, and most parts of the memory arrays M52, and is coupled to a rightmost memory cell (not shown in figures) of the memory array M52 and the control circuit MIO1. In some embodiments, the conductive lines CL61 and CL62 are configured to operate as a capacitor, and the conductive lines CL63 and CL62 are configured to operate as another capacitor.

As illustratively shown in FIG. 6, the conductive lines CL64-CL66 are arranged in order along the Y direction. Each of conductive lines CL64-CL66 crosses over the memory array M54, the connecting circuit JC52, the edge circuits EC56-EC58, and most parts of the memory arrays M53, and is coupled to a leftmost memory cell (not shown in figures) of the memory array M53 and the control circuit MIO5.

As illustratively shown in FIG. 6, the conductive lines CL67-CL69 are arranged in order along the Y direction, and are separated from the conductive lines CL64-CL66 along the X direction. Each of conductive lines CL67-CL69 crosses over the memory array M55, the connecting circuit JC53, the edge circuits EC59-EC511, and most parts of the memory arrays M56, and is coupled to a rightmost memory cell (not shown in figures) of the memory array M56 and the control circuit MIO5. Referring to FIG. 1 and FIG. 6, each of lengths of the conductive lines CL61-CL69 is larger than twice of the length L11 along the X direction.

Figure 7:
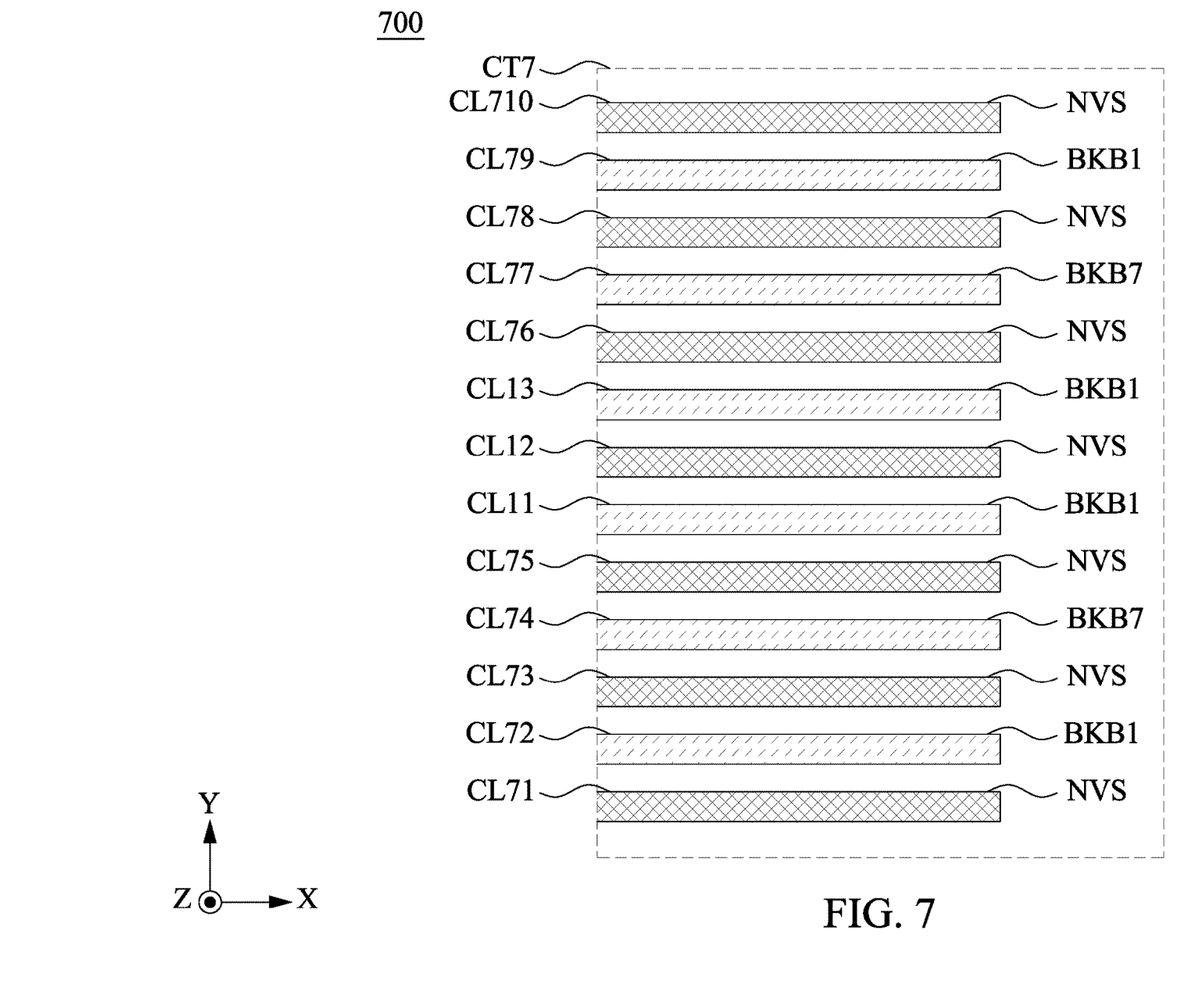
FIG. 7 is a schematic diagram of a semiconductor device corresponding to the semiconductor device shown in FIG. 1, in accordance with some embodiments of the present disclosure.

FIG. 7 is a schematic diagram of a semiconductor device 700 corresponding to the semiconductor device 100 shown in FIG. 1, in accordance with some embodiments of the present disclosure. In some embodiments, FIG. 7 corresponds to a layout view of the semiconductor device 700.

Referring to FIG. 7 and FIG. 1, the semiconductor device 700 is an alternative embodiment of the semiconductor device 100. The semiconductor device 700 includes a capacitor structure CT7 which is an alternative embodiment of the capacitor structure CT1. Comparing with the capacitor structure CT1, the capacitor structure CT7 is further formed by conductive lines CL71-CL710 included in the semiconductor device 700. In some embodiments, each of the conductive lines CL71-CL710 crosses over the memory array M12, the connecting circuit JC1, the edge circuits EC12-EC14 and most parts of the memory array M11, and is coupled to a leftmost memory cell (not shown in figures) of the memory array M11 and the control circuit MIO1.

As illustratively shown in FIG. 7, each of the conductive lines CL71-CL710 extends along the X direction. The conductive lines CL71-CL75, CL11-CL13 and CL76-CL710 are arranged in order along the Y direction. Each of the conductive lines CL71, CL73, CL75, CL76, CL78 and CL710 is configured to carry the voltage signal NVS. Each of the conductive lines CL72 and CL79 is configured to carry the control signal BKB1. Each of the conductive lines CL74 and CL77 is configured to carry a control signal BKB7.

In some embodiments, adjacent two of the conductive lines CL71-CL710 and CL11-CL13 are configured to operate as a capacitor. When at least one of voltage levels of the control signals BKB1 and BKB7 is changed, the voltage level of the voltage signal NVS is changed accordingly through capacitive coupling between the conductive lines CL71-CL710 and CL11-CL13.

Referring to FIG. 7 and FIG. 1, in some embodiments, the control circuit MIO1 is further configured to generate the control signal BKB7 according to the control signal BK1. In some embodiments, the control signal BK1 has at least two bits indicating the voltage levels of the control signals BKB1 and BKB7.

For example, when the bits of the control signal BK1 have a logic value of 00, each of the control signals BKB1 and BKB7 has a first voltage level. When the bits of the control signal BK1 have a logic value of 01, the control signal BKB1 has the first voltage level, and the control signal BKB7 has a second voltage level. When the bits of the control signal BK1 have a logic value of 10, the control signal BKB7 has the first voltage level, and the control signal BKB1 has the second voltage level. When the bits of the control signal BK1 have a logic value of 11, each of the control signals BKB1 and BKB7 has the second voltage level.

In some embodiments, the second voltage level is lower than the first voltage level. When one of the conductive lines CL72, CL74, CL11, CL13, CL77 and CL79 has the second voltage level, the adjacent ones of the conductive lines CL71, CL73, CL75, CL12, CL76, CL78 and CL710 are pulled low through capacitive coupling, to adjust the voltage level of the voltage signal NVS.

Figure 8:
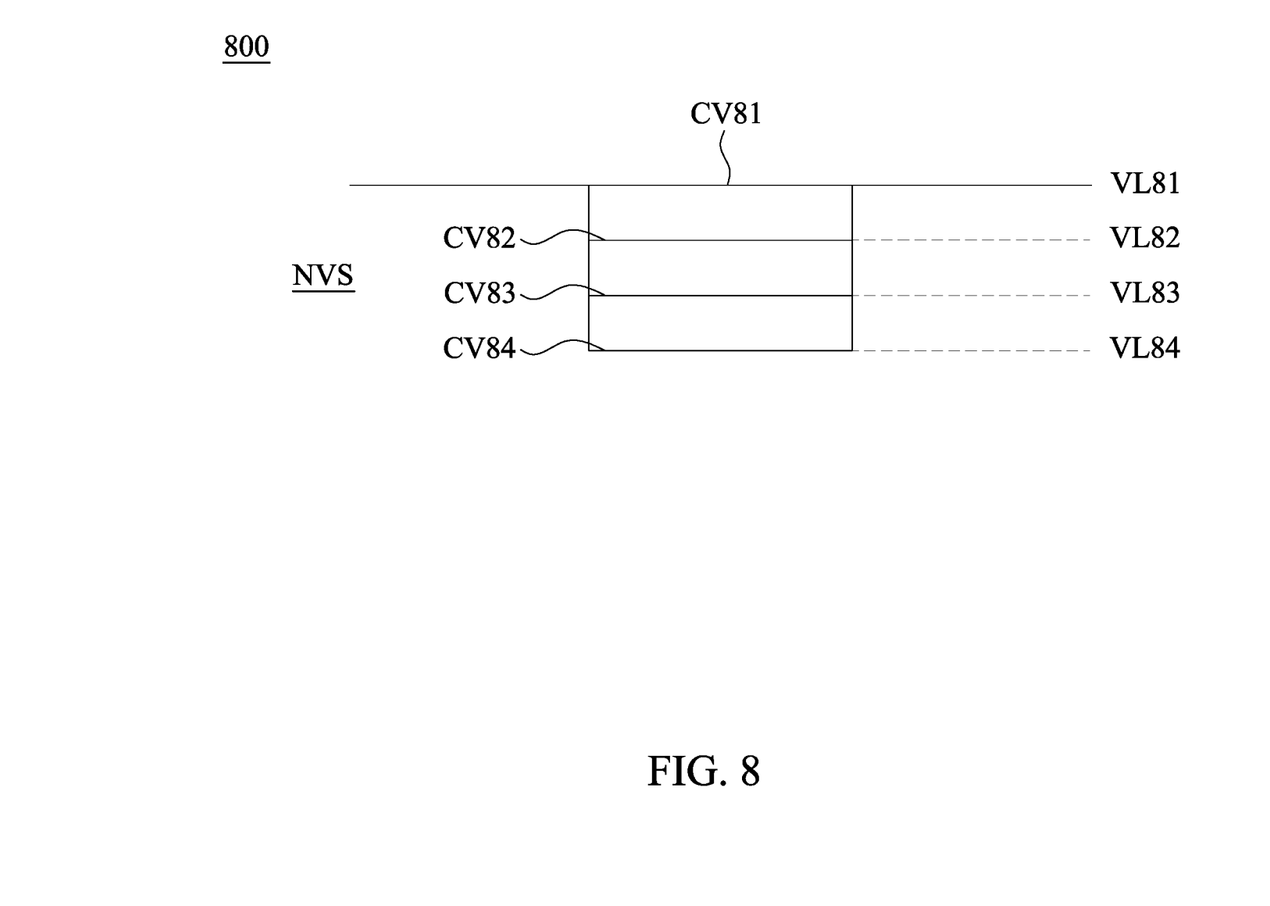
FIG. 8 is a waveform diagram of a voltage signal corresponding to the semiconductor device shown in FIG. 7, in accordance with some embodiments of the present disclosure.

FIG. 8 is a waveform diagram 800 of the voltage signal NVS corresponding to the semiconductor device 700 shown in FIG. 7, in accordance with some embodiments of the present disclosure. As illustratively shown in FIG. 8, the waveform diagram 800 includes curves CV81-CV84 of the voltage signal NVS. The curves CV81-CV84 have voltage levels VL81-VL84, respectively. The voltage levels VL81-VL84 are decreased in order.

Referring to FIG. 8, FIG. 7 and FIG. 1, the curves CV81-CV84 correspond to the logic values 00, 01, 10 and 11 of the control signal BK1, respectively. When the control signal BK1 have the logic value of 00, the voltage signal NVS is not pulled low, and has the voltage level VL81. When the control signal BK1 have the logic value of 01, the voltage signal NVS is pulled low by two conductive lines CL74 and CL77, and has the voltage level VL82. When the control signal BK1 have the logic value of 10, the voltage signal NVS is pulled low by four conductive lines CL72, CL11, CL13 and CL79, and has the voltage level VL83. When the control signal BK1 have the logic value of 11, the voltage signal NVS is pulled low by six conductive lines CL74, CL77, CL72, CL11, CL13 and CL79, and has the voltage level VL84. In some embodiments, the voltage signal NVS is adjusted to one of the voltage levels VL82-VL84 when one of the memory arrays M11, M12, M51 and M52 shown in FIG. 5 is written.

In various embodiments, the control signal BK1 has various numbers of bits, and the capacitor structure CT7 includes various numbers of conductive lines receiving various numbers of control signals. Accordingly, the voltage signal NVS is adjusted to various voltage levels.

Also disclosed is a semiconductor device. The semiconductor device includes a first memory array, a first bit line, a second memory array, a second bit line, a first conductive line and a first control circuit. The first bit line crosses over and is coupled to the first memory array, and extends along a first direction. The second bit line crosses over the second memory array, and is coupled to the first bit line. The first conductive line crosses over the second memory array and a part of the first memory array, and is configured to operate as a part of a first capacitor. The first control circuit is configured to couple the first conductive line to the second bit line when the first memory array is written.

Also disclosed is a semiconductor device. The semiconductor device includes a first memory array, a first bit line, a second bit line, a first conductive line and a first control circuit. The first memory array has a first length along a first direction. The first bit line is coupled to the first memory array, is disposed in a first layer and extends along the first direction. The second bit line is coupled to the first bit line, is disposed in a second layer and extends along the first direction. The first conductive line is configured to carry a first voltage signal, is disposed in a third layer and has a second length along the first direction. The first control circuit is configured to provide the first voltage signal to the second bit line when the first memory array is written. The first layer, the second layer and the third layer are arranged in order along a second direction different from the first direction. The second length is larger than twice of the first length.

Also disclosed is a method. The method includes: when a first memory array is written, coupling a first conductive line to a first bit line coupled to the first memory array; when a second memory array is written, coupling the first conductive line to a second bit line crossing over the first memory array; and coupling a third bit line to the second bit line through a first connecting circuit disposed between the first memory array and the second memory array. The first conductive line crosses over the first connecting circuit and the first memory array.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
a first memory array;
a first bit line crossing over and coupled to the first memory array, and extending along a first direction;
a second memory array;
a second bit line crossing over the second memory array, and coupled to the first bit line;
a first conductive line crossing over the second memory array and a part of the first memory array, and configured to operate as a part of a first capacitor; and
a first control circuit configured to turn on a first switch coupled between the first conductive line and the second bit line according to a first control signal which indicates whether the first memory array is written or not, to couple the first conductive line to the second bit line when the first memory array is written.

2. The semiconductor device of claim 1, further comprising:
a third bit line crossing over and coupled to the second memory array, and extending along the first direction,
wherein the first control circuit is further configured to turn on a second switch coupled between the first conductive line and the third bit line according to a second control signal which indicates whether the second memory array is written or not, to couple the first conductive line to the third bit line when the second memory array is written.

3. The semiconductor device of claim 1, further comprising:
a first conductive segment disposed between the first memory array and the second memory array, and configured to couple the first bit line to the second bit line,
wherein the first bit line, the first conductive segment and the second bit line are arranged in order along a second direction different from the first direction.

4. The semiconductor device of claim 1, further comprising:
a second conductive line crossing over the second memory array and the part of the first memory array, and configured to operate as the first capacitor with the first conductive line.

5. The semiconductor device of claim 4, further comprising:
a third conductive line crossing over the second memory array and the part of the first memory array, and configured to operate as a second capacitor with the first conductive line,
wherein the third conductive line, the first conductive line and the second conductive line are arranged in order along a second direction different from the first direction, and
each of the third conductive line and the second conductive line is configured to receive a second control signal from the first control circuit for adjusting a voltage level of the first conductive line.

6. The semiconductor device of claim 1, further comprising:
a third memory array; and a third bit line crossing over and coupled to the first memory array, and extending along the first direction,
wherein the first memory array, the second memory array and the third memory array are arranged in order along the first direction, and
the first conductive line further crosses over the third memory array.

7. The semiconductor device of claim 6, further comprising:
a fourth memory array;
a fourth bit line crossing over and coupled to the fourth memory array, and extending along the first direction; and
a fifth bit line crossing over the third memory array, and coupled to the fourth bit line,
wherein the second memory array, the third memory array and the fourth memory array are arranged in order along the first direction, and
the first conductive line further crosses over a part of the fourth memory array.

8. The semiconductor device of claim 1, further comprising:
a third memory array;
a third bit line crossing over and coupled to the third memory array, and extending along the first direction;
a fourth memory array;
a fourth bit line crossing over the fourth memory array, and coupled to the third bit line;
a second conductive line crossing over the fourth memory array and a part of the third memory array, and configured to operate as a part of a second capacitor; and
a second control circuit,
wherein the third memory array, the fourth memory array and the second control circuit are arranged in order and aligned with each other along the first direction, and
the third memory array and the first memory array are arranged in order along a second direction different from the first direction.

9. The semiconductor device of claim 1, further comprising:
a second conductive line configured to carry a voltage signal;
a third conductive line configured to operate as capacitors with each of first conductive line and the second conductive line, and configured to adjust the voltage signal based on a second control signal; and
a fourth conductive line configured to operate as a second capacitor with the second conductive line, and configured to adjust the voltage signal based on a third control signal different from the second control signal,
wherein the first conductive line is further configured to carry the voltage signal.

10. The semiconductor device of claim 9, wherein the first conductive line, the third conductive line, the second conductive line and the fourth conductive line are arranged in order, and
each of the third conductive line, the second conductive line and the fourth conductive line crosses over the second memory array and a part of the first memory array.

11. A semiconductor device, comprising:
a first memory array having a first length along a first direction;
a first bit line coupled to the first memory array, disposed in a first layer and extending along the first direction;
a second bit line coupled to the first bit line, disposed in a second layer and extending along the first direction;

a first conductive line configured to carry a first voltage signal, disposed in a third layer and having a second length along the first direction; and a first control circuit configured to turn on a first switch coupled between the first conductive line and the second bit line according to a first control signal which indicates whether the first memory array is written or not, to provide the first voltage signal to the second bit line when the first memory array is written, wherein the first layer, the second layer and the third layer are arranged in order along a second direction different from the first direction, and the second length is larger than twice of the first length.

12. The semiconductor device of claim 11, further comprising:

a second conductive line configured to carry a second control signal, disposed in the third layer and having the second length along the first direction, wherein the first control circuit is further configured to adjust the first voltage signal according to the second control signal.

13. The semiconductor device of claim 12, further comprising:

a second memory array having the first length along the first direction;

a third bit line coupled to the second memory array, disposed in the first layer and extending along the first direction; and a fourth bit line coupled to the third bit line, disposed in the second layer and extending along the first direction, wherein the second length is larger than four times of the first length.

14. The semiconductor device of claim 12, further comprising:

a second memory array having the first length along the first direction;

a third bit line coupled to the second memory array, disposed in the first layer and extending along the first direction;

a fourth bit line coupled to the third bit line, disposed in the second layer and extending along the first direction; and a third conductive line separated from the first conductive line, configured to carry the first voltage signal, disposed in the third layer and having the second length along the first direction.

15. The semiconductor device of claim 11, further comprising:

a plurality of first conductive lines configured to carry the first voltage signal; and a plurality of second conductive lines configured to operate as capacitors with adjacent ones of the plurality of first conductive lines, wherein a first part of the plurality of second conductive lines and a second part of the plurality of second conductive lines have different voltage levels, and the first conductive line is included in the plurality of first conductive lines.

16. The semiconductor device of claim 15, wherein when the first part has a first voltage level and the second part has a second voltage level, the first voltage signal has a third voltage level, and when the first part has the second voltage level and the second part has the first voltage level, the first voltage signal has a fourth voltage level different from the third voltage level.

17. A method, comprising:

when a first memory array is written, turning on a first switch coupled between a first conductive line and a first bit line according to a first control signal which indicates whether the first memory array is written or not, to couple the first conductive line to the first bit line coupled to the first memory array;

when a second memory array is written, turning on a second switch coupled between the first conductive line and a second bit line according to a second control signal which indicates whether the first memory array is written or not, to couple the first conductive line to the second bit line crossing over the first memory array; and coupling a third bit line to the second bit line through a first connecting circuit disposed between the first memory array and the second memory array, wherein the first conductive line crosses over the first connecting circuit and the first memory array.

18. The method of claim 17, further comprising:

adjusting a voltage level of the first conductive line though a second conductive line and a third conductive line; and operating the first conductive line, the second conductive line and the third conductive line as two capacitors coupled in parallel, wherein the first conductive line is disposed between the second conductive line and the third conductive line, and each of the second conductive line and the third conductive line crosses over the first connecting circuit and the first memory array.

19. The method of claim 18, further comprising:

adjusting each of the second conductive line and the third conductive line to a first voltage level and adjusting a fourth conductive line to a second voltage level, to adjust the first conductive line to a third voltage level;

adjusting each of the second conductive line and the third conductive line to the second voltage level and adjusting the fourth conductive line to the first voltage level, to adjust the first conductive line to a fourth voltage level; and adjusting each of the fourth conductive line, the second conductive line and the third conductive line to the second voltage level, to adjust the first conductive line to a fifth voltage level, wherein the fourth conductive line crosses over the first connecting circuit and the first memory array, and the fourth voltage level is between the third voltage level and the fifth voltage level.

20. The method of claim 18, further comprising:

coupling a fourth bit line to a fifth bit line through a second connecting circuit disposed between a third memory array and a fourth memory array, wherein each of the first conductive line, the second conductive line and the third conductive line further crosses over the second connecting circuit and the third memory array.

* * * * *